US010612440B2

(12) United States Patent
Wang et al.

(10) Patent No.: US 10,612,440 B2
(45) Date of Patent: Apr. 7, 2020

(54) INDUCTION HEATING-ASSISTED CATALYSTS

(71) Applicant: GM GLOBAL TECHNOLOGY OPERATIONS LLC, Detroit, MI (US)

(72) Inventors: Lei Wang, Rochester Hills, MI (US); Gongshin Qi, Troy, MI (US); Xingcheng Xiao, Troy, MI (US); Wei Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 100 days.

(21) Appl. No.: 15/949,554

(22) Filed: Apr. 10, 2018

(65) Prior Publication Data

US 2019/0309670 A1 Oct. 10, 2019

(51) Int. Cl.
| | |
|---|---|
| *F01N 3/027* | (2006.01) |
| *F01N 3/20* | (2006.01) |
| *B01D 46/00* | (2006.01) |
| *B01D 53/94* | (2006.01) |
| *B01J 38/02* | (2006.01) |
| *B01J 38/12* | (2006.01) |
| *F01N 3/035* | (2006.01) |
| *H05B 6/10* | (2006.01) |
| *H05B 6/36* | (2006.01) |

(52) U.S. Cl.
CPC ....... *F01N 3/2013* (2013.01); *B01D 46/0063* (2013.01); *B01D 53/944* (2013.01); *B01D 53/9418* (2013.01); *B01J 38/02* (2013.01); *B01J 38/12* (2013.01); *F01N 3/027* (2013.01); *F01N 3/035* (2013.01); *F01N 3/2066* (2013.01); *H05B 6/10* (2013.01); *H05B 6/36* (2013.01); *B01D 2255/102* (2013.01); *B01D 2279/30* (2013.01); *F01N 2510/06* (2013.01)

(58) Field of Classification Search
CPC ............................ F01N 3/2013; F01N 3/2026
See application file for complete search history.

(56) References Cited

U.S. PATENT DOCUMENTS

| | | | | |
|---|---|---|---|---|
| 5,393,499 A | * | 2/1995 | Bagley | F01N 3/02 422/173 |
| 2018/0252135 A1 | * | 9/2018 | Crawford | F01N 3/2026 |
| 2018/0264456 A1 | * | 9/2018 | Takase | B01J 35/04 |

FOREIGN PATENT DOCUMENTS

| | | |
|---|---|---|
| CN | 110359990 A | 10/2019 |
| DE | 102019108496 A1 | 10/2019 |

OTHER PUBLICATIONS

"Plasma with Induction," UltraFlex Power Technologies, 3 pages, [retrieved on Jul. 9, 2018]. Retrieved from the Internet< URL: https://ultraflexpower.com/induction-heating-applications/induction-heating-applications-plasma/>.

* cited by examiner

*Primary Examiner* — Jonathan R Matthias
(74) *Attorney, Agent, or Firm* — Harness, Dickey & Pierce, P.L.C.

(57) ABSTRACT

A component of an exhaust system is provided. The component includes a housing extending from an inlet at a first end to an outlet at an opposing second end, an electrically conductive material disposed within the housing, and an induction coil configured to emit a magnetic field. The magnetic field is operable to heat the electrically conductive material from a first temperature of greater than or equal to about −20° C. to less than or equal to about 50° C. to a second temperature of greater than or equal to about 200° C. to less than or equal to about 700° C. in a time period of less than or equal to about 20 seconds.

17 Claims, 5 Drawing Sheets

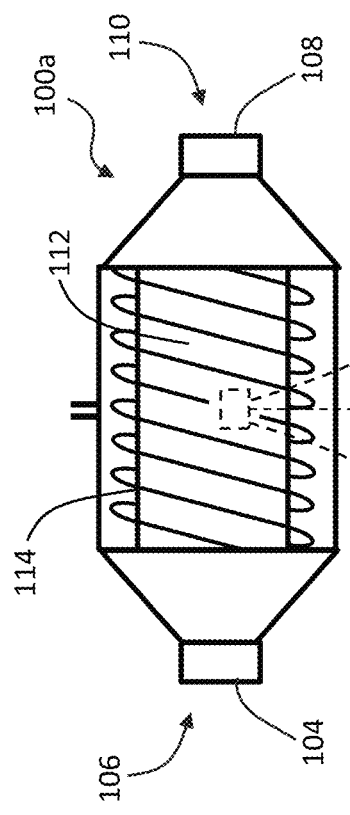
FIG. 3A
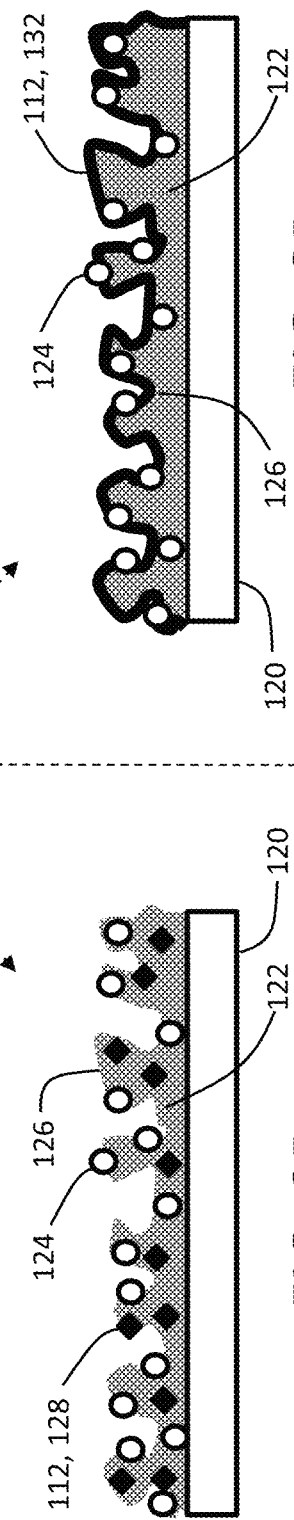
FIG. 3D
FIG. 3B
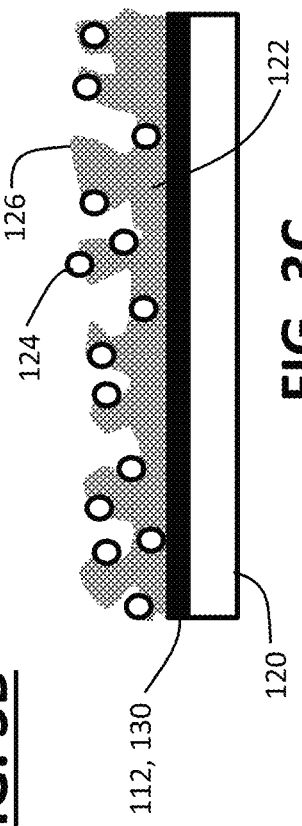
FIG. 3C

INDUCTION HEATING-ASSISTED CATALYSTS

INTRODUCTION

This section provides background information related to the present disclosure which is not necessarily prior art.

Some existing vehicles have exhaust gas aftertreatment systems to reduce the amounts of carbon monoxide (CO), unburned hydrocarbons (HC), nitrogen oxides (collectively, $NO_x$), and particulate matter that are discharged to the atmosphere in the exhaust from internal combustion engines that power the vehicles. Existing exhaust gas aftertreatment systems may be most effective in treating the exhaust from a warmed-up engine because the catalyst materials have been heated to temperatures (e.g., 200° C. and above) at which the catalyst materials serve to effectively oxidize carbon monoxide and incompletely burned fuel constituents to carbon dioxide and water, and to reduce nitrogen oxides to nitrogen gas. The existing exhaust gas aftertreatment systems have been effective for both gasoline engines operating at or around the stoichiometric air-to-fuel ratio and diesel engines (and other lean-burn engines) operating with excess air (sometimes called "lean burn" engines).

It has been difficult to treat exhaust emissions immediately following a cold engine start, before the exhaust has heated catalysts and/or particulate filters to the respective effective temperatures for designated catalytic reactions or soot burn-off. Lean-burn engines, such as diesel engines, tend to produce cooler exhaust streams because of the excess air used in the combustion mixtures charged to the cylinders of the diesel engine. Untreated cold start emissions may make up a significant portion of the total regulated emissions at a tailpipe of a vehicle. Mixed nitrogen oxides in the exhaust of diesel engines have been difficult to reduce. These nitrogen oxides include nitric oxide (NO) and nitrogen dioxide ($NO_2$); the mixture may be typically referred to as $NO_x$.

SUMMARY

This section provides a general summary of the disclosure, and is not a comprehensive disclosure of its full scope or all of its features.

In various aspects, the present technology provides a component of an exhaust system, the component including a housing extending from an inlet at a first end to an outlet at an opposing second end; an electrically conductive material disposed within the housing; and an induction coil configured to emit a magnetic field, wherein the magnetic field is operable to heat the electrically conductive material from a first temperature of greater than or equal to about −20° C. to less than or equal to about 50° C. to a second temperature of greater than or equal to about 200° C. to less than or equal to about 700° C. in a time period of less than or equal to about 20 seconds.

In one aspect, the component further includes a substrate; a washcoat layer disposed on the substrate; and a catalyst embedded in the washcoat layer, wherein the electrically conductive material is in contact with the washcoat layer such that when the electrically conductive material heats, the catalyst disposed in the washcoat layer becomes heated and activated.

In one aspect, the component has a heating layer including the electrically conductive material, the heating layer being disposed on an outer surface of the washcoat layer or between the substrate and the washcoat layer.

In one aspect, the electrically conductive material includes a plurality of electrically conductive particles disposed on a surface of the washcoat layer, within the washcoat layer, or a combination thereof.

In one aspect, the electrically conductive particles have a diameter of greater than or equal to about 500 nm to less than or equal to about 100 μm.

In one aspect, the electrically conductive material includes Fe, $Fe_xO_y$, Ag, $AgO_x$, $Ag_xO$, SiC, stainless steel, a perovskite, a powder thereof, particles thereof, or combinations thereof.

In one aspect, the catalyst has a platinum group metal selected from the group including ruthenium (Ru), rhodium (Rh), palladium (Pd), osmium (Os), iridium (Ir), platinum (Pt), and combinations thereof.

In one aspect, the washcoat layer includes $Al_2O_3$, $CeO_2$, $ZrO_2$, zeolites, platinum group metals, transition metals, oxides, or combinations thereof.

In one aspect, the substrate is monolithic.

In one aspect, the component further includes a substrate, and a particulate filter coupled to the substrate, wherein the substrate includes the electrically conductive material.

In one aspect, the electrically conductive material includes silicon carbide (SiC).

In one aspect, the component is configured such that when the electrically conductive material heats, the particulate filter is regenerated by burning off soot lodged within the filter.

In one aspect, the component is a particulate filter, a selective catalyst reduction (SCR) system, or a SCR with a filter (SCRF).

In various aspects, the present technology also provides a component of an exhaust system, the component including at least one of a washcoat having a catalyst and an electrically conductive material, and a substrate including SiC coupled to a particulate filter; and an induction coil coiled around the at least one of the washcoat and the substrate, the induction coil being configured to emit a magnetic field, wherein the magnetic field is operable to heat the at least one of the washcoat, by way of the electrically conductive material, and the substrate from a first resting temperature of greater than or equal to about −20° C. to less than or equal to about 50° C. to a second temperature of greater than or equal to about 200° C. to less than or equal to about 700° C. in a time period of less than or equal to about 20 seconds.

In one aspect, the component includes the washcoat and the heating of the washcoat, by way of the electrically conductive material, heats and activates the catalyst.

In one aspect, the component includes the substrate and the heating of the substrate burns off soot lodged in the particulate filter.

In one aspect, the component includes both the washcoat and the substrate.

In various aspects, the present technology yet further provides a method of operating a component of an exhaust system, the component including an electrically conductive material disposed within a housing and an induction coil coiled around the electrically conductive material, the method including causing an alternating current to be passed through the induction coil, wherein the induction coil emits an alternating magnetic field that contacts the electrically conductive material and causes the electrically conductive material to emit heat, such that the electrically conductive material converts from a first resting temperature of greater than or equal to about −20° C. to less than or equal to about 50° C. to a second temperature of greater than or equal to about 200° C. to less than or equal to about 700° C. in a time period of less than or equal to about 20 seconds.

In one aspect, the component further includes a substrate and a washcoat layer disposed on the substrate, the washcoat layer having a catalyst and the electrically conductive material, and wherein the heat emitted from the electrically conductive material heats and activates the catalyst.

In one aspect, the component further includes a substrate, and a particulate filter coupled to the substrate, the substrate including the electrically conductive material, wherein heat emitted from the electrically conductive material burns off soot lodged within the filter.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3A is an illustration of an exemplary exhaust system component including a catalyst according to various aspects of the current technology.

FIG. 3B is a first blown up view of a portion of the exhaust system component shown in FIG. 3A, wherein the exhaust system component includes the catalyst and electrically conductive particles embedded within a washcoat.

FIG. 3C is a second blown up view of a portion of the exhaust system component shown in FIG. 3A, wherein the exhaust system component includes the catalyst embedded within a washcoat, wherein the washcoat is disposed on a heating layer including an electrically conductive material.

FIG. 3D is a third blown up view of a portion of the exhaust system component shown in FIG. 3A, wherein the exhaust system component includes the catalyst embedded within a washcoat, wherein a heating layer including an electrically conductive material is disposed on the washcoat.

Corresponding reference numerals indicate corresponding parts throughout the several views of the drawings.

DETAILED DESCRIPTION

Figure 1A:
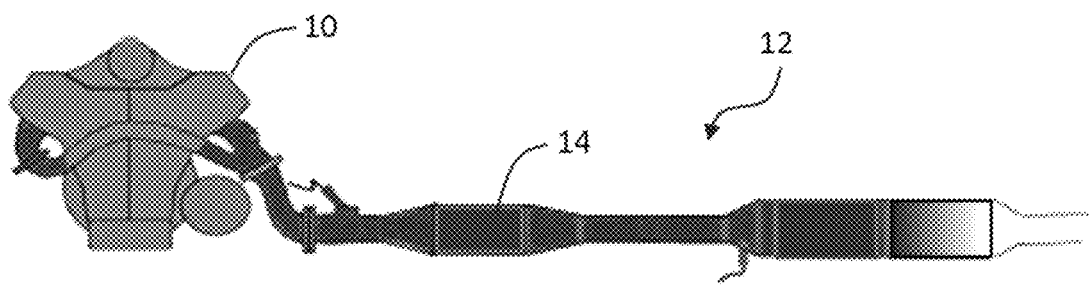
FIG. 1A is an illustration of a system for heating an exhaust system component from a cold start by additional fuel injection.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

A majority of emissions occur during a cold start period, before catalysts are warmed up and activated and before particulate filters are regenerated. Therefore, effective control of emissions during the cold start period is important for meeting emission standards now and in the future. For example, super ultra-low emissions vehicle 30 (SULEV30) targets a greater than 80% reduction in non-methane organic gas (NMOG)+$NO_x$ and a greater than 50% increase in fuel economy by 2025. Additionally, fuel-saving technologies lower exhaust temperatures, which makes activating catalysts and regenerating particulate filters challenging.

As used herein a "cold start" refers to starting a vehicle's engine when the engine and exhaust system components are cold relative to the engine's and components' normal operating temperature. A cold start is performed, for example, when the engine and exhaust system components are at about, i.e., within about 10° C. of, outside ambient temperature. In contrast, a "warm start" refers to starting a vehicle's engine when the engine is near, i.e., within about 20% of operating temperature and the exhaust system components are cool relative to their normal operating temperature, and a "hot start" refers to starting a vehicle's engine when both the engine and the exhaust system components are near operating temperatures. Whether a vehicle requires a cold start, a warm start, or a hot start depends on the ambient temperature, the length of time that the vehicle was last operated, and the time elapsed since the vehicle was last operated. Exhaust system components include catalytic converts, which combine oxygen with CO and HC to produce carbon dioxide ($CO_2$) and water ($H_2O$) and may also reduce $NO_x$ to $N_2$; diesel oxidation catalysts (DOCs), which convert HC to $CO_2$; selective catalytic reduction (SCR) systems, which reduce $NO_x$ to $N_2$; diesel particulate filters (DPFs), which trap particulate matter (PM); and SCRF in filter (SCRF) systems, which combine SCR systems with DPFs.

Catalysts, such as platinum group member (PGM) catalysts, for treating CO, HC, NMOG, $NO_x$, and other pollutants are heat activated. The activation temperature can be from greater than or equal to about 200° C. to less than or equal to about 800° C. Similarly, a particulate filter, that removes particulate matter from exhaust gas, requires heating to greater than or equal to about 200° C. to less than or equal to about 800° C. in order to burn off soot that remains lodged in the filter after the vehicle's engine is last turned off. Therefore, activating catalysts and regenerating particulate filters by heating should be performed as quickly as possible.

Figure 1B:
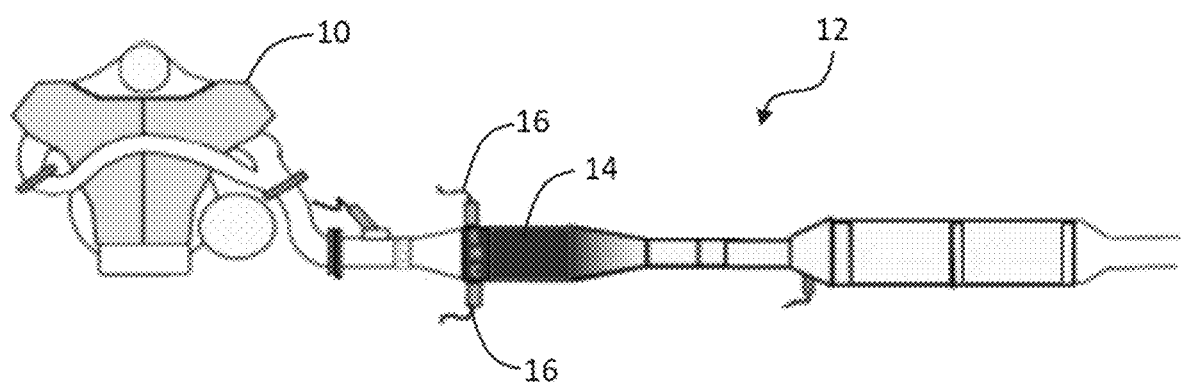
FIG. 1B is an illustration of a system for heating an exhaust system component from a cold start by an electric heating element.
Figure 1C:
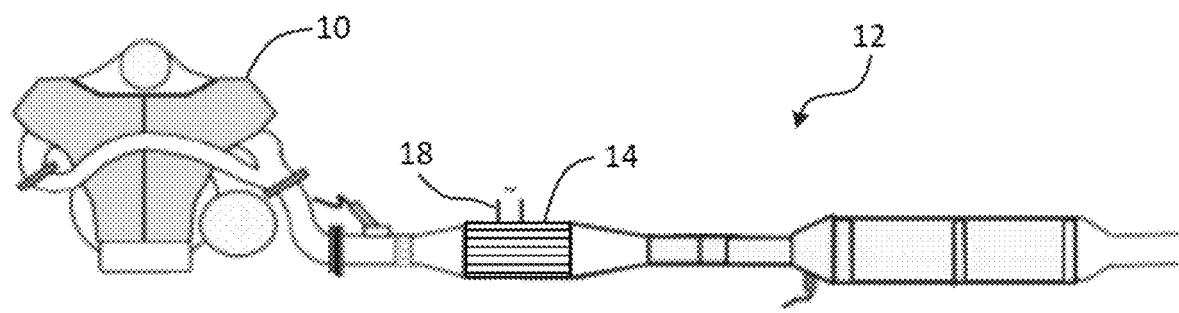
FIG. 1C is an illustration of a system for heating an exhaust system component from a cold start by induction heating according to various aspects of the current technology.

A first system for heating an exhaust system component from a cold start is shown in FIG. 1A. In particular, this figure shows an engine 10 and an exhaust system 12 comprising an exhaust system component 14. Here, the entire exhaust system 12 is heated by additional fuel injection. The shading in the figure represents heat. FIG. 1B shows the engine 10 and the exhaust system 12 of FIG. 1A. Here, however, the exhaust system component 14 includes an electrically heated catalyst (EHC). In this arrangement, the exhaust system component 14 is associated with a heating element 16, which selectively heats the exhaust system component 14, as shown by the shading. FIG. 1C shows a system according to the current technology. Here, the engine 10 and the exhaust system 12 of FIG. 1A are shown. However, the exhaust system component 14 of the exhaust system 12 is selectively heated by induction by introducing high frequency alternating current (AC) to the exhaust system component 14 through an induction coil 18.

Figure 2A:
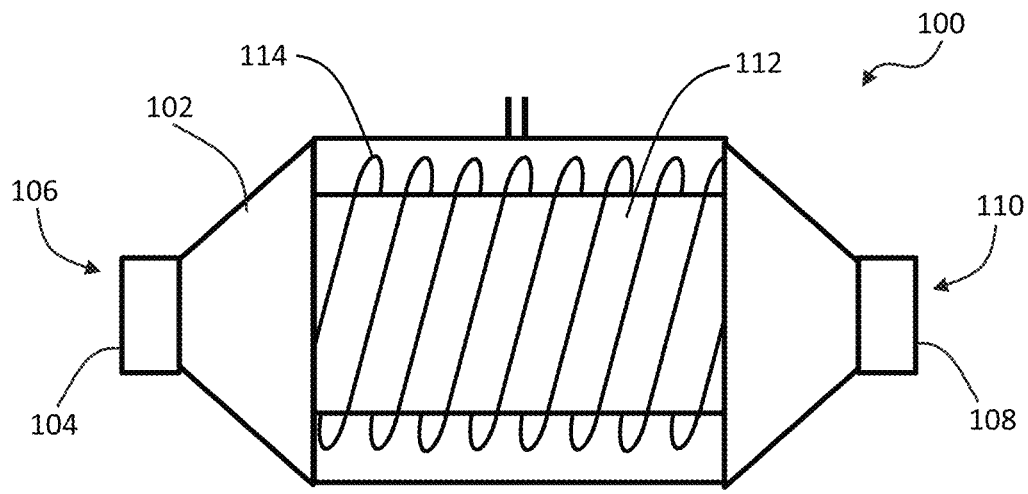
FIG. 2A is an illustration of an exemplary exhaust system component according to various aspects of the current technology.

Accordingly, the present technology provides exhaust system components that are configured to be heated quickly from a cold start in order to activate catalysts or regenerate particulate filters. As shown in FIG. 2A, the present technology provides a component 100 of an exhaust system. The component 100 can be a component comprising a catalyst, such as a catalytic converter, a DOC, a SCR system, or a SCRF system or a component comprising a particulate filter such as a DPF. In some embodiments, the component 100 is a combination component that includes both a catalyst and a particulate filter, such as a SCRF system.

Figure 2B:
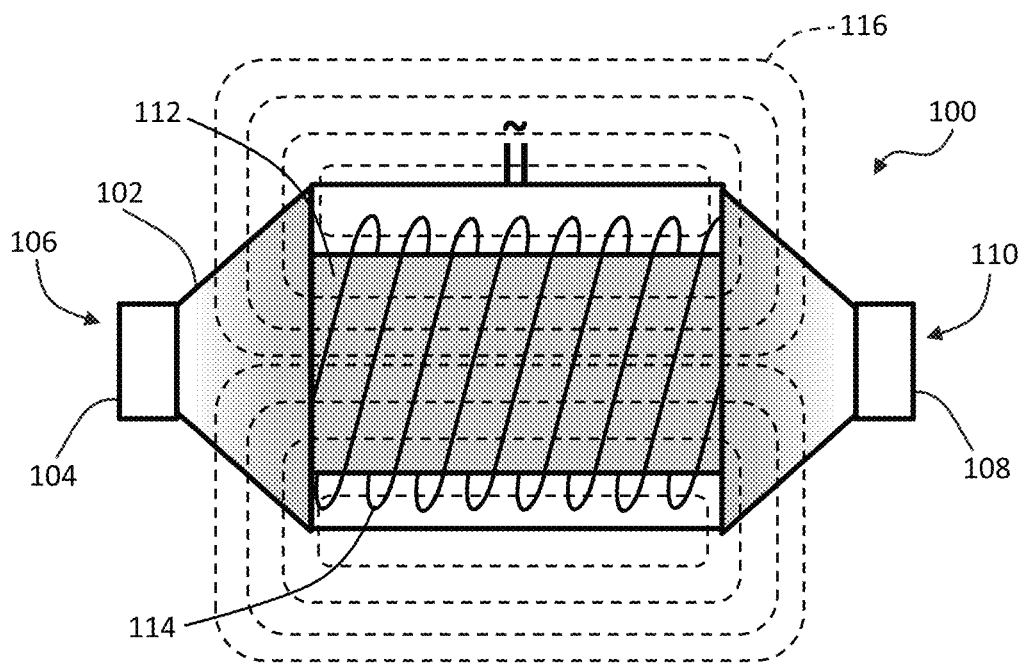
FIG. 2B is an illustration of the exhaust system component shown in FIG. 2A during operation.

The component 100 comprises a housing 102 extending from an inlet 104 at a first end 106 to an outlet 108 at an opposing second end 110. An electrically conductive material 112 is disposed within the housing 102 and an induction coil 114 is coiled around the electrically conductive material 112. The induction coil 114 is configured to emit a magnetic field 116 (see FIG. 2B), for example, when a high frequency AC passes through the induction coil 114. High frequency AC generates induction heating with a shallow skin effect, i.e., penetration, relative to the relatively deep skin effect generated by low frequency AC. The magnetic field 116 is a rapidly alternating magnetic field. FIG. 2B shows the same component 100 as shown in FIG. 2A, but in FIG. 2B, a high frequency AC, denoted as "~," is passing through the induction coil 114, which causes the induction coil to emit the magnetic field 116. The frequency of the high frequency AC is greater than or equal to about 5 KHz to less than or equal to about 1 MHz, or greater than or equal to about 100 KHz to less than or equal to about 500 KHz. FIG. 2A shows the component 100 in an off or standby mode and FIG. 2B shows the component 100 in an on or operated mode. The magnetic field 116 is operable to heat the electrically conductive material 112 (as shown by the shading in FIG. 1B, where darker shading is indicative of higher heat relative to lighter or no shading) from a first temperature, such as a temperature at a cold start, of greater than or equal to about −20° C. to less than or equal to about 50° C. to a second temperature of greater than or equal to about 200° C. to less than or equal to about 800° C. in a time period of less than or equal to about 20 seconds, less than or equal to about 15 seconds, less than or equal to about 10 seconds, or less than or equal to about 5 seconds. More particularly, the magnetic field 116 generates eddy currents in the electrically conductive material 112, which flow the resistance of the electrically conductive material 112, which heats the electrically conductive material 112 by Joule heating. When the electrically conductive material 112 is a ferromagnetic or ferromagnetic material, e.g., iron, heat may also be generated by magnetic hysteresis losses.

In various aspects of the current technology, the component 100 comprises an induction heating-assisted catalyst. Such a component is shown as component 100a in FIG. 3A. FIGS. 3B, 3C, and 3D show variations of the component 100a. In each of FIGS. 3B, 3C, and 3D, the component 100a further comprises a substrate 120 (i.e., a catalyst substrate), a washcoat layer 122 disposed on the substrate, and a catalyst 124 embedded within the washcoat layer 122. The substrate 120 can be monolithic and comprises $MgO \cdot 2Al_2O_3 \cdot 5SiO_2$, as a non-ligating example. The washcoat layer 122 is a carrier for the catalysts 124, which is used to disperse the catalysts 124 over a high surface area. The washcoat layer comprises $Al_2O_3$, $CeO_2$, $ZrO2$, zeolites, platinum group metals, transition metals, oxides, or combinations thereof, as non-limiting examples.

More particularly, the component 100a comprises a plurality of catalysts 124, wherein each catalyst of the plurality is at least partially embedded in the washcoat layer 122. By "at least partially embedded" it is meant that each catalyst 124 is either partially embedded in the washcoat layer 122, such that a portion of the catalyst is not embedded in the washcoat layer 122, i.e., the partially embedded catalyst 124 is on an exposed or outer surface 126 of the washcoat layer 122, or completely embedded in the washcoat layer 122. The electrically conductive material 112 is in contact with the washcoat layer 122 such that when the electrically conductive material 112 heats, the catalyst 124 disposed in the washcoat layer 122 becomes heated and activated. The catalyst 124 comprises a platinum group metal selected from the group consisting of ruthenium (Ru), rhodium (Rh), palladium (Pd), osmium (Os), iridium (Ir), platinum (Pt), and combinations thereof.

In FIG. 3B, the electrically conductive material 112 comprises a plurality of electrically conductive particles 128 at least partially embedded within the washcoat layer 122, such that the electrically conductive particles 128 are disposed on the exposed or outer surface 126 of the washcoat layer 122, completely within the washcoat layer 122, or a combination thereof. The electrically conductive particles 128 have a diameter of greater than or equal to about 500 nm to less than or equal to about 100 μm, greater than or equal to about 1 μm to less than or equal to about 75 μm, or greater than or equal to about 20 nm to less than or equal to about 50 μm. The electrically conductive material 112 has a concentration in the washcoat layer 122 of greater than or equal to about 10 wt. % to less than or equal to about 50 wt. %, or greater than or equal to about 20 wt. % to less than or equal to about 40 wt. %.

In FIG. 3C, the component 100a comprises an intermediate heating layer 130 comprising the electrically conductive material 112. In this embodiment, the intermediate heating layer 130 is disposed between the substrate 120 and the washcoat layer 122, such that the washcoat layer 122 is disposed on the substrate 120 by way of the intermediate heating layer 130.

In FIG. 3D, the component 100a comprises a surface heating layer 132 comprising the electrically conductive material 112. In this embodiment, the surface heating layer 132 is disposed on the exposed or outer surface 126 of the washcoat layer 122.

With further reference to FIGS. 3C and 3D, in some embodiments, the intermediate heating layer 130 and the surface heating layer 132 consist essentially of the electrically conductive material 112. By "consist essentially of," it is meant that the intermediate heating layer 130 and the surface heating layer 132 can include trace amounts, i.e., less than or equal to about 10 wt. %, of impurities that do not affect the conductive nature of the electrically conductive material 112. In other embodiments, the intermediate heating layer 130 and the surface heating layer 132 comprise the electrically conductive material 112. For example, the intermediate heating layer 130 and the surface heating layer 132 can include electrically conductive particles that are disposed within a matrix material. The matrix material can be any material that conducts heat, such as, for example, a heat conductive perovskite, metal oxide, polymer, or combination thereof, as non-limiting examples. The electrically conductive particles in the matrix material are present at a concentration of greater than 0 wt. % to less than or equal to about 25 wt. %, or greater than 0 wt. % to less than or equal to about 20 wt. %.

In each of FIGS. 3B, 3C, and 3D, the electrically conductive material 112 comprises Fe, $Fe_xO_y$ (e.g., FeO, $Fe_2O_3$ or $Fe_3O_4$), Ag, $AgO_x$, $Ag_xO$ (e.g., $Ag_2O$), SiC, stainless steel (SS), perovskites, powders thereof, particles thereof, or combinations thereof as non-limiting examples. In regard to $Fe_xO_y$, $AgO_x$, and $Ag_xO$, x and y are each individually integers, such as, for example, integers between 0 and 5. Here, exhaust from a vehicle's engine flows into the component 100a through the inlet 104, interacts with the catalysts 124 inductively heated by the electrically conductive material 112 (indirectly through the washcoat layer 122 or directly through direct contact with the electrically conductive material 112), and flows out of the component 100a through the outlet 108.

Figure 4A:
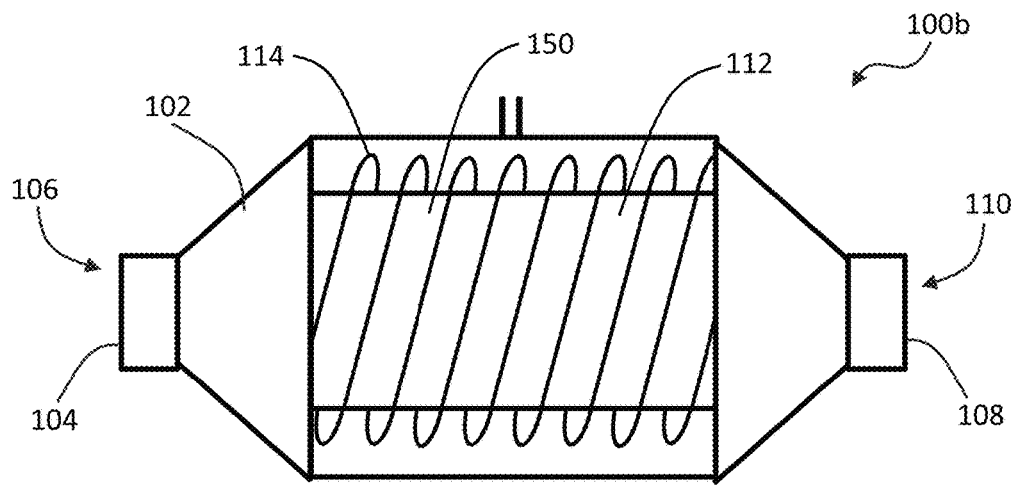
FIG. 4A is an illustration of an exemplary exhaust system component including a particulate filter according to various aspects of the current technology.
Figures 4B, 4C:
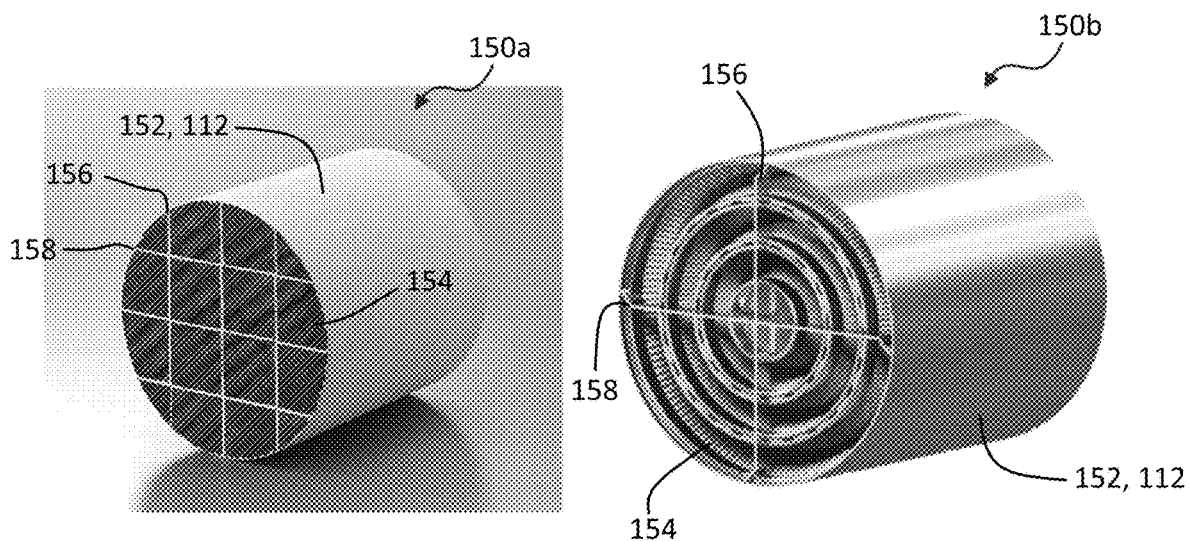
FIG. 4B is an image of a first exemplary particulate filter.
FIG. 4C is an image of a second exemplary particulate filter.

In various other aspects of the current technology, the component 100 of FIGS. 2A and 2B comprises a particulate filter. Such as component is shown as a component 100b in FIG. 4A and may be, for example, a particulate filter, a SCR system, or a SCRF system. Here, the component 100b comprises a particulate filter 150. A first exemplary particulate filter 150a is shown in FIG. 4B and a second exemplary particulate filter 150b is shown in FIG. 4C. Each exemplary particulate filter 150a, 150b comprises a substrate 152 (i.e., a filter substrate) comprising the electrically conductive material 112 and a filter 154. As shown in FIGS. 4B and 4C, the substrate 152 is cylindrical and comprises at least one vertical internal wall 156 and at least one horizontal internal wall 158. The filter 154 is embedded within the internal walls 156, 158. However, the substrate 152 can have any geometry that makes suitable contact with the filter 154, such that when the substrate 152 is heated, the filter 154 heats as well. The electrically conductive material 112 is non-limiting and comprises Fe, $Fe_xO_y$ (e.g., FeO, $Fe_2O_3$ or $Fe_3O_4$), Ag, $Ag_xO$ (e.g., $Ag_2O$), SiC, stainless steel (SS), or a combination thereof as non-limiting examples. In regard to $Fe_xO_y$, $AgO_x$, and $Ag_xO$, x and y are each individually integers, such as, for example, integers between 0 and 5. During operation, the substrate 152 comprising the electrically conductive material 112 is inductively heated, which heats the filter 154 and any particulate matter, such as soot or small particles, lodged or trapped within the filter. The heat causes burn-off and release of the particulate matter and regenerates the filter 154.

Figure 5A:
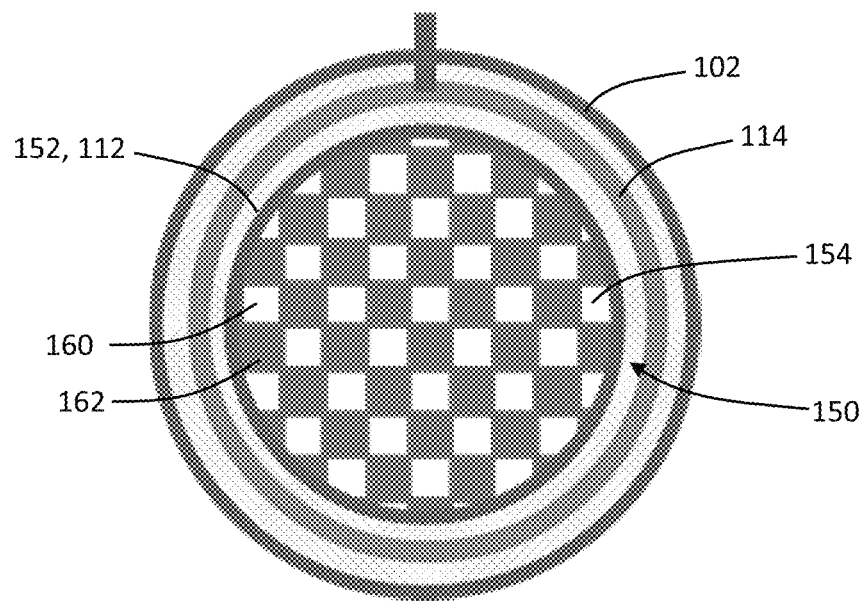
FIG. 5A is a perspective view of the exhaust system component shown in FIG. 4A.
Figure 5B:
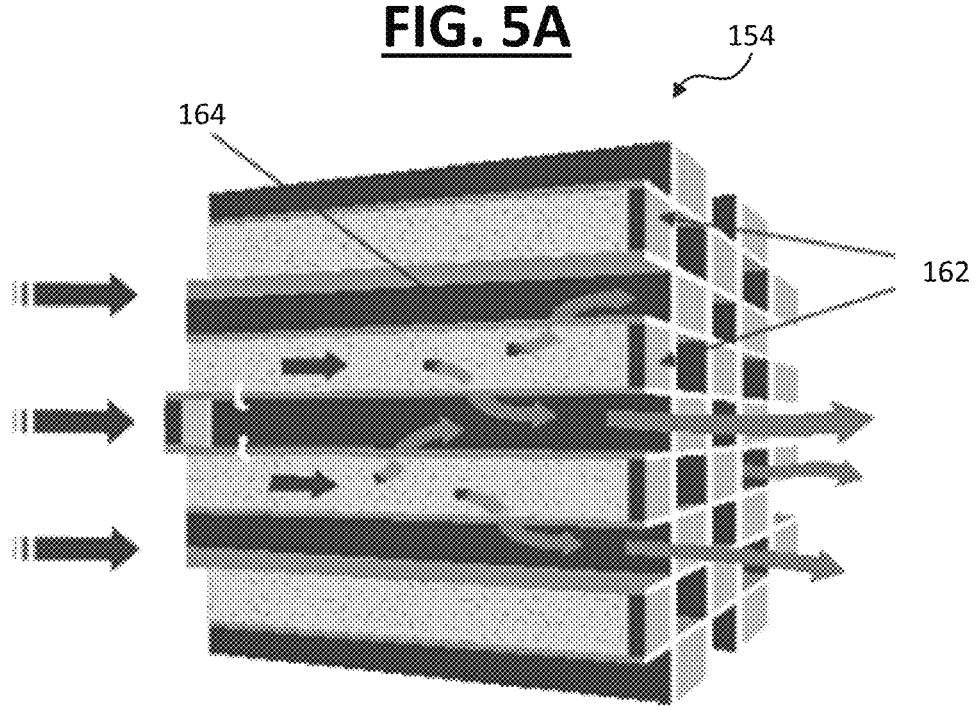
FIG. 5B is a three-dimensional view of a portion of the exhaust system component shown in FIG. 5A.

The burn-off of particulate matter is shown in FIGS. 5A and 5B. FIG. 5A shows a cross-sectional view of the component 100b of FIG. 4A having the housing 102, the induction coil 114, and the particulate filter 150, wherein the particulate filter 150 comprises the substrate 152 comprising the electrically conductive material 112 and the filter 154. The filter 154 has open, unclogged cells 160 and clogged or plugged cells 162. FIG. 5B is a three dimension view of a portion of the filter 154. Here, the filter 154 includes trapped particulate matter 164, which generates the plugged cells 162. Exhaust from an engine flows into the filter 154 in the direction of the black arrows. During a cold start, inductive heating of the substrate 152 heats the filter 154, which burns off the trapped particulate matter 164 and causes the trapped particulate matter 164 to flow out of the filter 154 in the direction of the gray arrows. In this manner, the filter 154 is regenerated.

Accordingly, the present technology provides a component of an exhaust system that comprises at least one of a washcoat comprising a catalyst and an electrically conductive material, and a substrate (i.e., a filter substrate) comprising an electrically conductive material coupled to a particulate filter. The component further comprises an induction coil coiled around the at least one of the washcoat and the substrate, wherein the induction coil is configured to emit a magnetic field around the at least one of the washcoat and the substrate. The magnetic field is operable to heat the at least one of the washcoat, by way of the electrically conductive material, and the substrate from a first resting temperature of greater than or equal to about −20° C. to less than or equal to about 50° C. to a second temperature of greater than or equal to about 200° C. to less than or equal to about 700° C. in a time period of less than or equal to about 20 seconds. The washcoat and the substrate are discussed above.

The present technology also provides a method of operating a component of an exhaust system. The component comprises an electrically conductive material disposed within a housing and an induction coil coiled around the electrically conductive material. Accordingly, the component can be any component described herein. The method comprises causing an AC, such as a high frequency AC, to be passed through the induction coil. Causing the AC to be passed through the induction coil can be performed by, for example, operating the component by starting a vehicle. The induction coil emits an alternating magnetic field that contacts the electrically conductive material and causes the electrically conductive material to emit heat, such that the electrically conductive material converts from a first resting temperature of greater than or equal to about −20° C. to less than or equal to about 50° C. to a second temperature of greater than or equal to about 200° C. to less than or equal to about 700° C. in a time period of less than or equal to about 20 seconds.

In various embodiments, the component further comprises a substrate (i.e., a catalyst substrate) and a washcoat layer disposed on the substrate, the washcoat layer comprising a catalyst and the electrically conductive material, and wherein the heat emitted from the electrically conductive material heats and activates the catalyst.

In other embodiments, the component further comprises a substrate (i.e., a filter substrate), and a particulate filter coupled to the substrate comprising the electrically conductive material, wherein heat emitted from the electrically conductive material burns off soot lodged within the filter.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A component of an exhaust system, the component comprising:
   a housing extending from an inlet at a first end to an outlet at an opposing second end;
   a substrate disposed within the housing,
   a washcoat layer comprising a catalyst disposed on the substrate;
   a heating layer comprising an electrically conductive material disposed on an outer surface of the washcoat layer, the electrically conductive material comprising Ag, $AgO_x$, $Ag_xO$, SiC, stainless steel, a perovskite, a powder thereof, particles thereof, or combinations thereof; and
   an induction coil coiled around the substrate,
   wherein the induction coil is configured to emit a magnetic field, and the electrically conductive material is configured to emit heat when contacted by the magnetic field to raise a temperature of the component from a first temperature of greater than or equal to about −20° C. to less than or equal to about 50° C. to a second temperature of greater than or equal to about 200° C. to less than or equal to about 700° C. in a time period of less than or equal to about 20 seconds.

2. The component according to claim 1, wherein the electrically conductive material comprises a plurality of electrically conductive particles.

3. The component according to claim 2, wherein the electrically conductive particles have a diameter of greater than or equal to about 500 nm to less than or equal to about 100 μm.

4. The component according to claim 1, wherein the electrically conductive material comprises Ag, $AgO_x$, $Ag_xO$, or combinations thereof.

5. The component according to claim 1, wherein the catalyst comprises a platinum group metal selected from the group consisting of ruthenium (Ru), rhodium (Rh), palladium (Pd), osmium (Os), iridium (Tr), platinum (Pt), and combinations thereof.

6. The component according to claim 1, wherein the washcoat layer comprises $Al_2O_3$, $CeO_2$, ZrO2, zeolites, platinum group metals, transition metals, oxides, or a combination thereof.

7. The component according to claim 1, wherein the substrate is monolithic.

8. The component according to claim 1, further comprising:
a particulate filter coupled to the substrate.

9. The component according to claim 8, wherein the electrically conductive material comprises silicon carbide (SiC).

10. The component according to claim 9, wherein the component is configured such that when the electrically conductive material heats, the particulate filter is regenerated by burning off soot lodged within the filter.

11. The component according to claim 10, wherein the component is a particulate filter, a selective catalyst reduction (SCR) system, or a SCR with a filter (SCRF).

12. A component of an exhaust system, the component comprising:
a washcoat layer comprising a catalyst
a plurality of electrically conductive particles in contact with the washcoat layer, the plurality of electrically conductive particles having a diameter of greater than or equal to about 500 nm to less than or equal to about 100 μm and comprising Ag, $AgO_x$, $Ag_xO$, SiC, stainless steel, a perovskite, a powder thereof, particles thereof, or combinations thereof; and
an induction coil coiled around the washcoat layer,
wherein the induction coil is configured to emit a magnetic field and the plurality of electrically conductive particles are configured to emit heat when contacted by the magnetic field to heat the washcoat layer from a first resting temperature of greater than or equal to about −20° C. to less than or equal to about 50° C. to a second temperature of greater than or equal to about 200° C. to less than or equal to about 700° C. in a time period of less than or equal to about 20 seconds.

13. The component according to claim 12, wherein the heating of the washcoat, by way of the plurality of electrically conductive particles heats and activates the catalyst.

14. The component according to claim 12, wherein the washcoat is disposed on a substrate.

15. A method of operating a component of an exhaust system, the method comprising:
causing an alternating current to be passed through an induction coil coiled around a substrate disposed within a housing that extends from an inlet at a first end to an outlet at an opposing second end, a washcoat layer comprising a catalyst being disposed on the substrate and a heating layer comprising an electrically conductive material disposed on an outer surface of the washcoat layer, the electrically conductive material comprising Ag, $AgO_x$, $Ag_xO$, SiC, stainless steel, a perovskite, a powder thereof, particles thereof, or combinations thereof,
wherein the induction coil emits an alternating magnetic field that contacts the electrically conductive material and causes the electrically conductive material to emit heat, such that the component converts from a first resting temperature of greater than or equal to about −20° C. to less than or equal to about 50° C. to a second temperature of greater than or equal to about 200° C. to less than or equal to about 700° C. in a time period of less than or equal to about 20 seconds.

16. The method according to claim 15, wherein the heat emitted from the electrically conductive material heats and activates the catalyst.

17. The method according to claim 15, wherein the component further comprises a particulate filter coupled to the substrate, and wherein heat emitted from the electrically conductive material burns off soot lodged within the filter.

* * * * *